United States Patent
Shehane

(10) Patent No.: US 10,981,819 B2
(45) Date of Patent: Apr. 20, 2021

(54) VARIABLE PULSED IONIC WASTE STREAM RECLAMATION SYSTEM AND METHOD

(71) Applicant: Fluent Technologies, LLC, Dublin, OH (US)

(72) Inventor: Philip C. Shehane, Columbus, GA (US)

(73) Assignee: Fluent Technologies, LLC, Dublin, OH (US)

( * ) Notice: Subject to any disclaimer, the term of this patent is extended or adjusted under 35 U.S.C. 154(b) by 426 days.

(21) Appl. No.: 16/021,072

(22) Filed: Jun. 28, 2018

(65) Prior Publication Data
US 2020/0002207 A1    Jan. 2, 2020

(51) Int. Cl.
| | |
|---|---|
| C02F 9/00 | (2006.01) |
| H02J 3/00 | (2006.01) |
| C02F 1/469 | (2006.01) |
| C02F 1/44 | (2006.01) |
| C02F 1/42 | (2006.01) |
| C02F 1/36 | (2006.01) |

(52) U.S. Cl.
CPC .............. *C02F 9/00* (2013.01); *C02F 1/4691* (2013.01); *H02J 3/00* (2013.01); *C02F 1/36* (2013.01); *C02F 1/42* (2013.01); *C02F 1/444* (2013.01); *C02F 2001/422* (2013.01); *C02F 2001/425* (2013.01); *C02F 2001/427* (2013.01); *C02F 2209/05* (2013.01); *C02F 2209/06* (2013.01); *C02F 2209/08* (2013.01); *C02F 2209/10* (2013.01); *C02F 2301/026* (2013.01); *C02F 2301/046* (2013.01); *C02F 2303/18* (2013.01)

(58) Field of Classification Search
CPC .................. C02F 1/46; C02F 9/00; C02F 1/44
See application file for complete search history.

(56) References Cited

U.S. PATENT DOCUMENTS

2012/0006742 A1 * 1/2012 Theodore .................. C02F 9/00
                                                                                   210/602

FOREIGN PATENT DOCUMENTS

WO    WO-2015002014 A1 *   1/2015    .............. C02F 1/283

* cited by examiner

*Primary Examiner* — Walter D. Griffin
*Assistant Examiner* — Cameron J Allen
(74) *Attorney, Agent, or Firm* — Mueller Law, LLC; Jerry K. Mueller, Jr.

(57) ABSTRACT

A method for treating wastewater having one or more of suspended solids, dissolved solids, biological oxygen demand includes solids filtration followed by a bi-polar/bi-directional flow through ionic module fitted with anionically/cationically charged plates followed by a sub-sonic resonance module followed by another bi-polar/bi-directional flow through ionic module followed by a ultra-sonic resonance module followed by one or more anion/cation collection membrane modules. Recycle is provided in each step, wherein each step may be repeated, and wherein one or more of the steps can be bypassed.

5 Claims, 10 Drawing Sheets

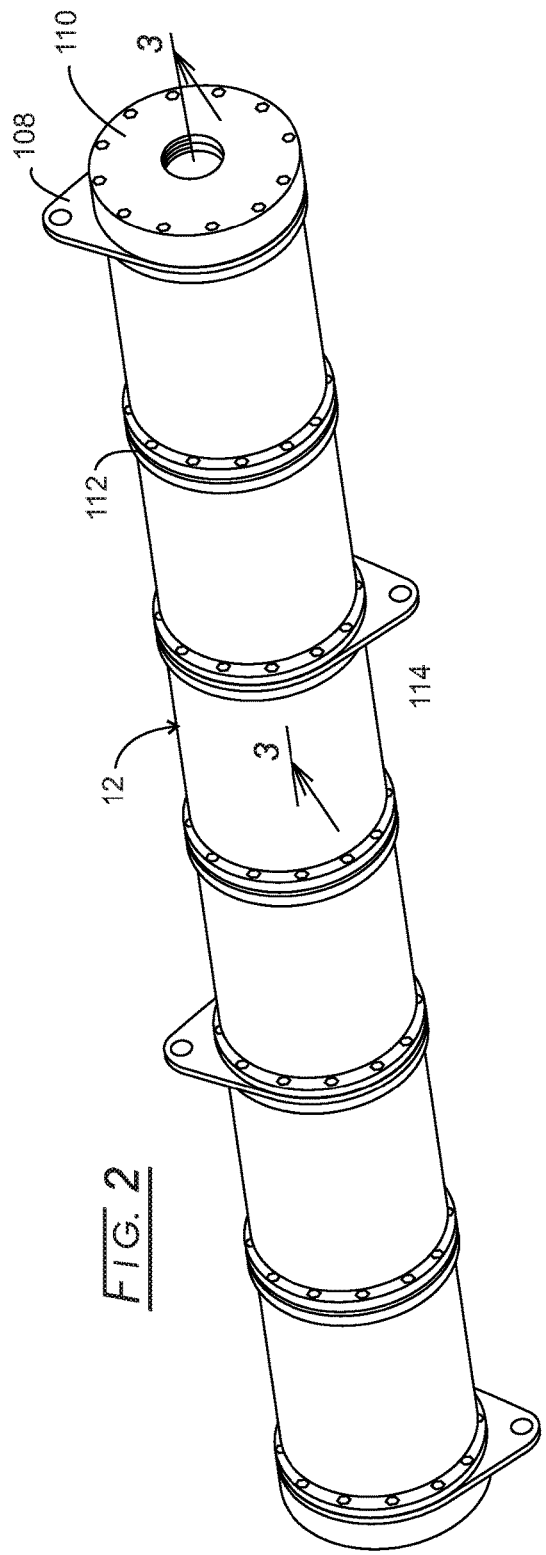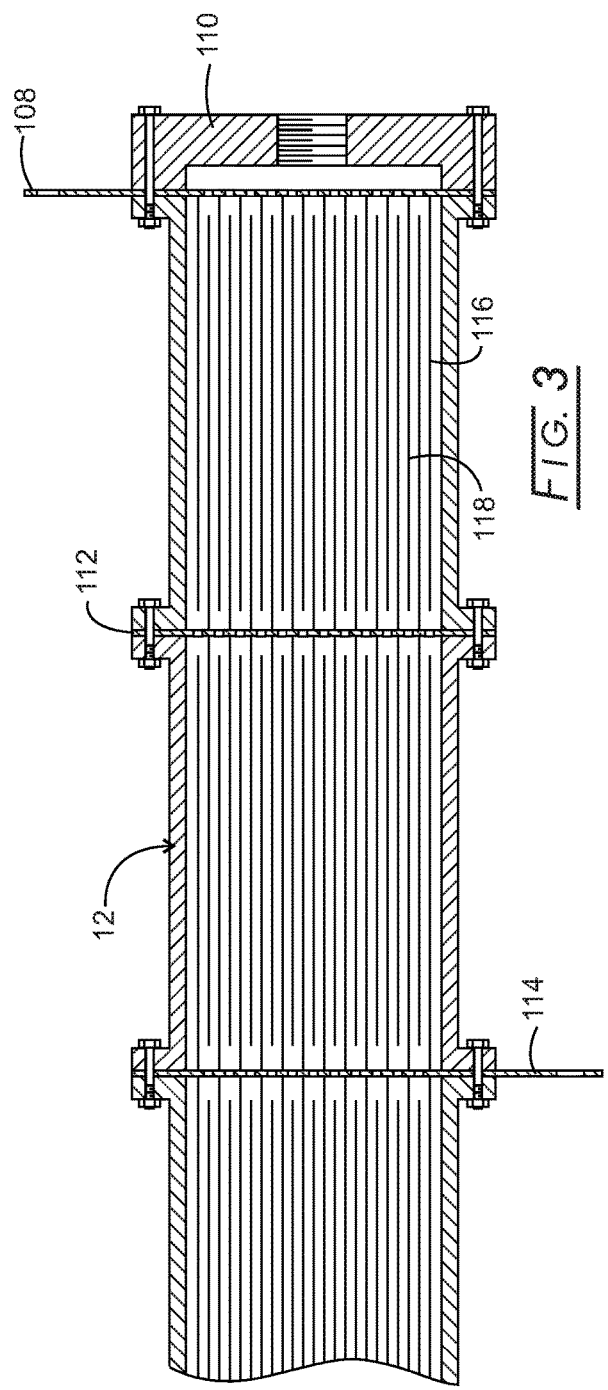

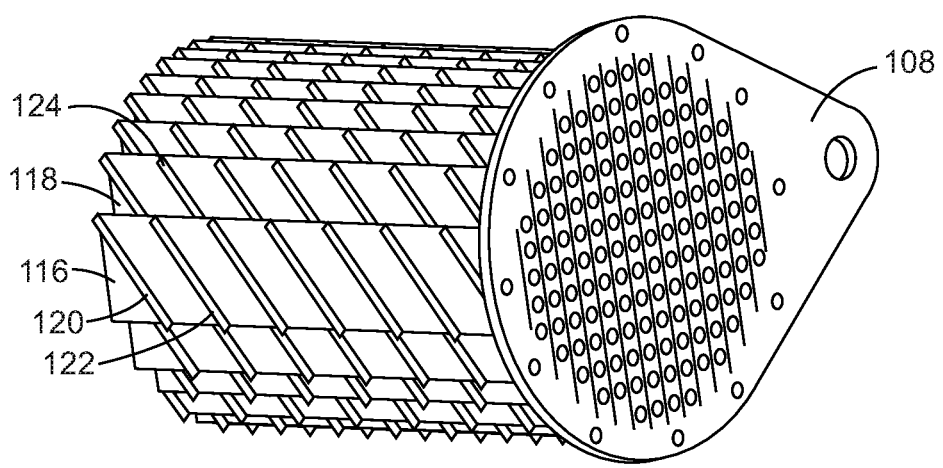
FIG. 4
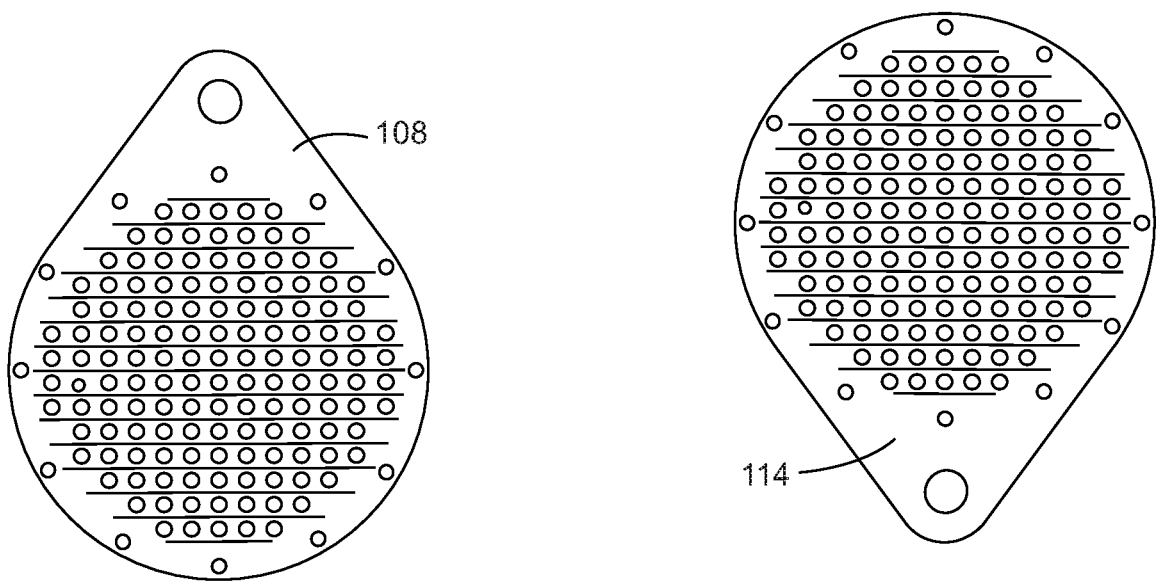
FIG. 5
FIG. 6
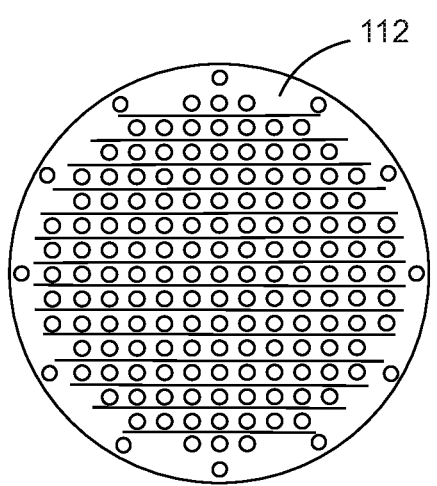
FIG. 7

VARIABLE PULSED IONIC WASTE STREAM RECLAMATION SYSTEM AND METHOD

CROSS-REFERENCE TO RELATED APPLICATIONS

None.

STATEMENT REGARDING FEDERALLY SPONSORED RESEARCH

Not applicable.

BACKGROUND

The present invention generally relates to waste stream remediation and more particularly the use of acoustic energy in combination with ionic energy and additional unit operations disclosed below.

The initial step in processing a waste stream often begins by taking a sample of the given waste stream and subjecting the sample to analysis, which often includes sending it to a certified analytical laboratory to determine the exact isotopic configuration, or chemical composition, within the given waste stream. The information gathered from this analysis is in the form of total suspended solids (TSS), total dissolved solids (TDS), biological oxygen demand (BOD), pH, conductivity, and various isotopes or elements, as desired by the end user. In addition, particle size distribution (usually in microns) of the total suspended solids may be required to determine the level of pre-process filtration required in preparing the waste stream for further processing. The TSS level often requires being addressed prior to addressing the TDS and various isotopes associated with the TDS. This is not the case for every waste stream, in that the TSS level may be at a drastically lower ratio to the liquid of the given waste stream.

Typical of prior proposals in this field include, for example:

U.S. Pat. No. 5,549,812 [Witt] discloses enhanced efficiency of electrolytic treating industrial wastewater using a specific amount of hertz in a pulsating direct current supply with sacrificial/consumable electrodes.

U.S. Pat. No. 5,531,865 [Cole] discloses removing contaminants from wastewater by passing a stream through an electrolytic oxidation vessel chamber containing anodes in parallel with cathodes.

U.S. Pat. No. 6,887,368 [Khalemsky, et al.] discloses heavy metals electroextraction from solutions and wastewater by passing the fluids through an electroreactor with two 3-electrode stacks and applying 3-phase alternating current to the solution.

U.S. Publication No. 2004/0050781 [Coffey, et al.] discloses water purification by electrolytically forming molecular halogen, hypohalic acid and/or hypohalite ions from halide ions dissolved in water and dissolving metal(s) in water to provide metal ion(s), which can be subsequently removed.

U.S. Publication No. 2013/0180857 [Heffernan, et al.] discloses an electro-coagulation cleaning system for liquid waste into the system with a "heavies" collection unit, electro-Coagulation treatment zone and scraping electrode unit.

U.S. Pat. No. 5,792,369 [Johnson] discloses non-chemical plasma ion water disinfection through a flow control canister.

U.S. Pat. No. 9,096,450 [Andrews, et al.] discloses removing or otherwise reducing the level of contaminants in water.

U.S. Publication No. 016/0031731 [Holland] discloses increasing rate by which dissimilar material are separated in water by passing the aqueous-based mixture through an electrically active housing.

Perng, Yuan-Shing, et al.; "Treatment of a specialty paper mill wastewater using a pilot-scale pulsed electrocoagulation unit." *Taiwan J For Sci* 3 (2007) discloses purification of an industrial water stream from a paper mill using pulsed electrocoagulation with a variety of electrode materials.

The disclosed reclamation system will be described in detail below.

BRIEF SUMMARY

Brief Description of the Drawings

For a more complete understanding of the nature and advantages of the present method and process, reference should be had to the following detailed description taken in connection with the accompanying drawings, in which:

FIG. 2 is an isometric view of a bi-polar/bi-directional flow through ionic module;

FIG. 3 is a sectional view taken along line 3-3 of FIG. 2;

FIG. 4 is an isometric view of the module of FIG. 2 with the outer shell removed;

FIG. 5 is a top view of the anode diffuser ionic electrode plate of the bi-polar/bi-directional flow through ionic module;

FIG. 6 is a top view of the cathode diffuser ionic electrode plate of the bi-polar/bi-directional flow through ionic module;

FIG. 7 is a top view of the tri-capacitive ionic diffuser plate of the bi-polar/bi-directional flow through ionic module;

DETAILED DESCRIPTION

Figure 1:
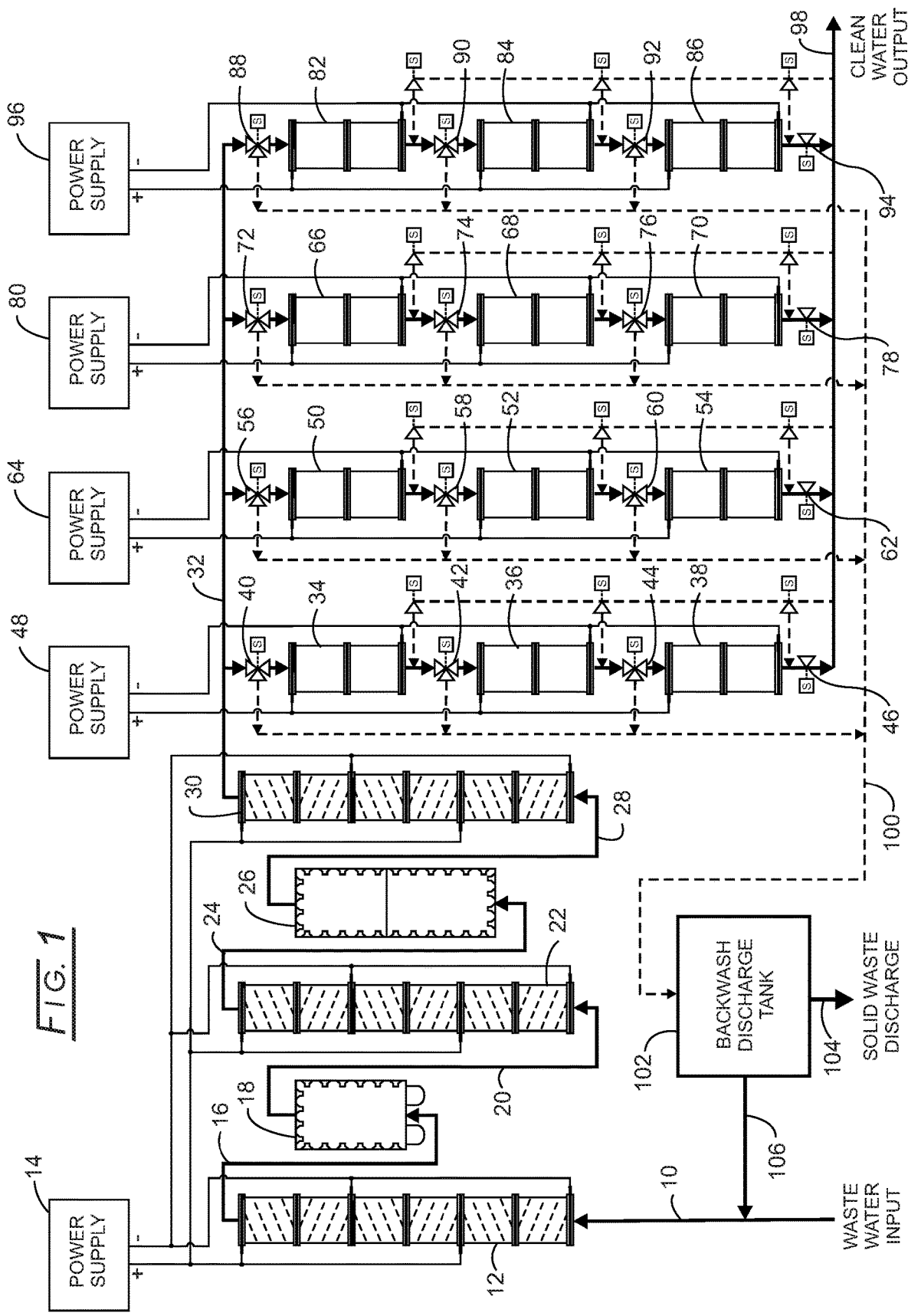
FIG. 1 is a system flow schematic.

To better understand the technology disclosed herein, the several process steps performed on any given waste stream are discussed initially. The initial step in processing a waste stream begins with taking a sample of the given waste stream to determine the exact content of the given waste stream. To that end, the sample is analyzed to determine the exact isotopic configuration, or chemical composition, of that given waste stream. An outside laboratory often may perform such analysis. The information gathered from this analysis often includes total suspended solids, (TSS), total dissolved solids, (TDS), biological oxygen demand, (BOD), pH, conductivity, and various isotopes or elements, as desired by the end user. In addition, particle size distribution, usually in microns, of the total suspended solids is required to determine the level of pre-process filtration required in preparing the waste stream for further processing. For the waste stream treated herein, the TSS level and various isotopes associated with the TDS should be addressed prior to addressing of the TDS. This is not the case for every waste stream in that the TSS may be at a drastically lower ratio to the liquid of the given waste stream.

The treatment scheme disclosed herein will be illustrated by using a waste stream data of an anaerobic digester. The additional isotopic identification necessary for determining the exact application of the technology being presented is as follows: ammonia, nitrate, nitrogen, phosphorous, sulfate, and chloride. Once the above information is obtained, the exact technological application of the disclosed system can be implemented in processing the waste stream. It will be understood that the disclosed system is sufficiently flexible and powerful to treat a wide variety of waste streams containing a multiple of different components to be removed.

Waste Stream Initial Findings

The waste stream sample data used to illustrate the disclosed system is set forth below:

| | |
|---|---|
| Total Suspended Solids (TSS) | 57,000 PPM (Parts Per Million) |
| Total Dissolved Solids (TDS) | 5,700 PPM (Parts Per Million) |
| pH | 7.9 (Potential Hydrogen or Alkalinity) |
| Conductivity | 26,900 μs/cm (Micro Siemens per Centimeter) |
| BOD (Biological Oxygen Demand) | 30,355 PPM (Parts Per Million) |
| Ammonia Nitrogen | 2,657 PPM (Parts Per Million) |
| Chloride | 746 PPM (Parts Per Million) |
| Iron | 1,853 PPM (Parts Per Million) |
| Calcium Total | 2,060 PPM (Parts Per Million) |
| Alkalinity Total | 13,700 PPM (Parts Per Million) |
| Nitrate Nitrogen | 209 PPM (Parts Per Million) |
| Phosphorous Total | 1,017 PPM (Parts Per Million) |
| Sulfate | 104 PPM (Parts Per Million) |
| Turbidity | 43,333 NTU (Nephelometric Turbidity Unit) |
| Waste Stream Total Suspended Solids (TSS) | 57,000 PPM (100%) |
| 100μ (Micron) Particle Size | 68.4 PPM (0.12%) |
| 70μ (Micron) Particle Size | 12,619.8 PPM (22.14%) |
| 50μ (Micron) Particle Size | 10,094.7 PPM (17.71%) |
| 20μ (Micron) Particle Size | 17,208.3 PPM (30.19%) |
| 10μ (Micron) Particle Size | 9,137.1 PPM (16.03%) |
| 5μ (Micron) Particle Size | 5,848.2 PPM (10.26%) |
| 1μ (Micron) Particle Size | 1,943.7 PPM (3.41%) |
| 0.01μ (Micron) Particle Size | 74.1 PPM (0.13%) |

For this waste stream, the TSS was 5.7% of the total volume. Nominal numbers for any given waste stream typically are 2% (20,000 PPM), or less. For this reason, it was necessary to address the TSS of this waste stream prior to treatment through the system. For some applications, an ultra-filter is part of the pre-treatment process in removing organic matter. By removing organic matter first, the TDS dissociation process happens at a much more rapid rate which contributes to faster process times and lower operating cost.

With this information, it was determined that the waste stream should be filtered down to a 0.01μ particle size to process the waste stream effectively and efficiently. This is not the case with every waste stream. It must be understood that every waste stream is unique and must be addressed individually to determine the best possible application of any process methodology. As previously stated, TDS levels of 2% or less usually do not require ultra-filtration, unless these solids are organic matter, by majority, and the particle size distribution analysis indicates most particles to be less than 1 micron. If this were the case, the use of an ultra-filter would serve to improve the efficiency of the system.

Removing Suspended Solids

It must be stated here that not every waste stream requires the level of pretreatment filtration, as does the waste stream used herein to illustrate the disclosed waste stream schema. Most waste streams can readily be fed directly into the system for processing. For illustration purposes, a disk filtration, micro filtration, and ultra filtration were chosen to implement. This facilitates reducing the particle size to less than about 0.01μ and effectively removes about 99.87% of the total suspended solids of this waste stream. Upon completion of the suspended solids removal, the sample is now ready to be processed by the disclosed treatment system.

Chemical Analysis

After the filtration lowering of the TSS, a new chemical analysis of the waste stream was determined, since the isotope level of components may have changed. This is especially true regarding BOD, pH, and conductivity.

The new analysis was obtained from the mass spectrum analysis of the waste stream to yield a more specific assessment as to the various isotopic composition of the waste stream. It also provides the amount of biological oxygen demand (BOD), turbidity, conductivity, and pH. For this test sample, it was determined to concentrate on removal of ammonia, chloride ions, iron, calcium, alkalinity, nitrate, phosphorous, and sulfate.

When analyzing the various isotopes, indication is given that there are many which lend themselves to molecular bonding with other elements and/or compounds within the waste stream. Ammonia, when oxidized, will bond readily with chlorides, nitrates, sulfates, and phosphates, thus creating ammonium chloride, ammonium nitrate, ammonium phosphate, and ammonium sulfate. This oxidation/bonding process acts as a contributor in the removal of these compounds in that, as the molecules are dissociated from the water molecule and bond together, they create a solid that can be collected for removal from the waste stream.

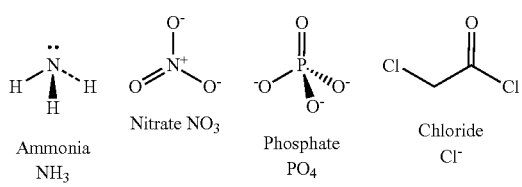

Production of Ammonium Nitrate Fertilizer

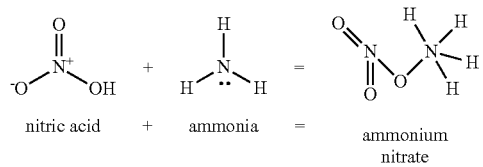

Ammonia and Phosphate to Ammonium Phosphate

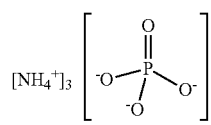

There is one additional step implemented during the analysis process that is different from any other known technology. The magnetic resonance frequency of a nucleus is determined by the magnetic field that the nucleus is in, and the gyromagnetic ratio of the nucleus. The magnetic field is referenced in Tesla Units. The standard used to reference this information is a Nuclear Magnetic Resonance Periodic Table or NMR. In a dry solid form, each of these isotopes would be crystalline in its molecular structure. In a solid form, each crystalline structure also would have an acoustic resonance. If that crystalline isotope is exposed to a resonant frequency for that given isotope, a vibration will be induced into the crystalline structure. This vibration, at resonance, will cause friction within the isotope, which in turn causes heat. With the introduction of an electro-magnetic field, the environment is created where a sub-harmonic of the actual nuclear magnetic resonance frequency can be applied to the molecule of water and the associated isotope; thus, enhancing the dissociation process. This resonant frequency or sub-harmonic resonant frequency is in a range from 20,000 Hz-230,000 Hz. An example, as applied to this waste stream, could be explained by using the phosphorous isotope NMR frequency. According to the NMR Periodic Table, the resonance frequency for phosphorous is 202.404 megahertz. There are 4 frequencies within the ultra-sonic frequency range of our system that are applicable to this process. There is only one frequency in the sub-sonic frequency range of the disclosed system that is applicable. The frequency chosen is determined also by the resonant frequencies of the other isotopes within the given waste stream. For a given waste stream it is very likely there will be multiple frequencies used in both the ultra-sonic and sub-sonic ranges. The harmonic relationship of the frequencies creates a dissonance or disharmony of frequencies induced into the waste stream. This dissonance creates a molecular excitation due to friction created from the dissonant frequencies.

It is the introduction of these dissonant frequencies which, when introduced to the water molecule in conjunction with a pulsed electrical signal of a sub harmonic, causes the water molecule to release its molecular bond on the dissolved solids in a process called dissociation. This dissociation of the dissolved solid molecule from the water molecule, when subjected to the resonant frequency or a sub-harmonic frequency and the pulsed electrical energy, which is pulsed at a sub-harmonic of the resonant frequency, is enhanced even more with the introduction of a sub-sonic frequency which is the lowest sub-harmonic of the established resonant frequency of a given isotope.

The sub-sonic, pulsed electrical signal, and the ultra-sonic frequencies are additive when induced simultaneously on the water molecule and, thus, create a greater application of force on the water molecule, causing the water molecule to release or dissociate the dissolved solid back to a semi-solid or solid form.

System Components

The disclosed system consists of several components, as described above, when assembled together, function as a single system to achieve the desired end results of a clean waste stream. For present purposes, each component of the system will be disclosed, giving operational parameters as it relates to the previously described waste stream. The exact details will be discussed later herein.

1. Variable Pulse/Variable Frequency Ionic Generator (Power Supply)
    a. Operating Input Voltage of 240VAC
    b. Output Voltage of 0-24, 0-32, 0-48 Volts Pulsed
    c. Pulse Rate of 0-600 Hz
    d. Current of 0-40 Amps
    e. Waveform: Sine, Square, Saw tooth
    f. Auto tuning
2. Bi-Polar/Bi-Directional Flow Through Ionic module (Cell-Ruthenium Oxide, Iridium Oxide coated, other metal oxide coatings)
    a. Capacitive Cell
    b. Tri-Capacitive Cell
    c. Capacitive Vortex Cell
    d. Tri-Capacitive Vortex Cell
3. Subsonic Particle Separation module
    a. 0-20 Hz (Acoustic Energy-greater than 400 watts per gallon instantaneous)
    b. UltraSonic Particle Separation module
    c. 20 Kilohertz to greater than 230 Kilohertz (Acoustic Energy-greater than 400 watts per gallon/instantaneous)
4. Pulsed Ionic Bi-Polar/Bi-Directional Ionic Collection module (Membrane)
    a. Cation Module
    b. Anion Module
    c. Cation/Anion Module How It All Works With the information obtained from the initial laboratory analysis of the waste stream, specific operational parameters are programmed into the system control firmware database network. Once this database has been established, as to the known isotopic composition of the waste stream, the resonant frequency of those isotopes, electrical characteristics, and possible isotopic bonding equations, the variable pulse/variable frequency ionic generator (power supply) operational parameters are established for the bi-polar/bi-directional flow through ionic module and programmed into the system database. These parameters can include any of the following; frequency, voltage AC and/or DC, current, wave form (sine wave, square wave, or saw tooth wave). The procedure is repeated for the variable pulse/variable frequency ionic generator (power supply) used to power the anion, cation, and anion/cation pulsed ionic bi-polar/bi-polar directional collection module (pulsed ionic bi-polar/bi-polar directional collection pulsed ionic bi-polar/bi-polar directional collection membrane) variations.

The operational parameters of the module then are programmed into the control oscillator. These parameters include frequency, wave shape (sine wave, square wave, saw tooth wave, etc.), and magnitude of the signal. These parameters are established based on the information obtained from the waste stream analysis.

The same information is used to establish the operating parameters of the ultra-sonic particle separation module. Once the operating frequencies have been established, those frequencies are then programmed into the controller and the UPSM is setup for operation.

Upon completion of the setup of the system control firmware database network (recipe), the system is then run through an auto tuning process to establish a baseline of operation. This auto tuning process is generated from the information stored in the system control firmware database. The method in which the auto tuning process takes place is completely proprietary and part of this patent process. As this baseline is established, the system will auto tune for consistent operation throughout the given waste stream process procedure.

When the system is turned on and referring to FIG. 1, a waste stream, 10, passes through a bi-polar/bi-directional flow through ionic module, 12, where the dissociation process begins with ionization of waste stream 10. Module 12 is connected to a power supply, 14. The introduction of a pulsed electrical signal will create molecular excitation of the water molecule. This excitation process also will create a friction in the water molecule. The output, 16, from module 14 is passed into a sub-sonic resonance module, 18. With the addition of the sub-sonic energy in sub-sonic particle separation module 18, both the electrical pulse and the sub-sonic energy are induced into the water molecule generating more excitation within the water molecule, promoting the dissociation process.

Next, the withdrawn waste stream, 20, is passed from module 18 into a second bi-polar/bi-directional flow through ionic module, 22, where it is once again subjected to another electrical pulse to intensify the ionization process. At this point in the discussion, it should be pointed out that the system is fitted with additional piping/valving systems to permit the waste stream flow to be recycled through prior modules, bypass certain modules, etc. Such recycle, and bypass lines are shown in the drawings, but will not be discussed herein leaving such alternative flow patterns to the expertise of the skilled artisan.

After passing through the module 22, a withdrawn waste stream, 24, then passes through an ultra-sonic particle separation module, 26, where even more energy is introduced to the water molecule, creating even more molecular excitation and, thus, facilitating the dissociation process. Whether sub-sonic module 18 and ultra-sonic module 26 are separate or housed within the same chamber is a function of the isotopic configuration of the given waste stream. The sub-sonic collection module is designed to separate the larger dissociated particles from the water molecule, while the ultra-sonic collection module is designed to separate the smallest microscopic particles dissociated from the water molecule. As each form of energy is imposed upon the waste stream, the water molecule goes through a process where dissolved solids are dissociated from the water molecule and returned to a semi-solid to solid state for removal and collection by a pulsed ionic bi-polar/bi-directional collection module (described below). However, before that takes place withdrawn waste stream, 28, is passed through a final flow through ionizing cell, 30, to impose a strong electrical charge to create a greater distance between the dissociated solid and the water molecule. This greater separation is a microscopic coagulation of the dissolved solids in preparation for removal from the waste stream in the pulsed ionic bi-polar/bi-directional collection module. This electrical charge will be beneficial to the removal of the dissociated isotope in the pulsed ionic bi-polar/bi-directional collection module (membrane). It should be pointed out that, while power supply 14 is shown connected to modules 12, 22, and 26, a separate power supply could be connected to each of such modules.

The waste stream is withdrawn from flow through ionizing cell 30 and then can be passed into any of the banks of modules, as with the overall process where streams can be recycled or passed to virtually any of the modules described herein depending upon the waste stream being treated and the combination of organic and/or inorganic contaminants to be removed and their concentration. In the system layout of FIG. 1, waste stream 32 will be passed through an anion collection module, a cation collection module, and finally an anion/cation collection module. Of course, each module could be a series of 2 or more modules with a variety of recycle possibilities as described elsewhere herein. FIG. 1 shows a series of 3 of each of the collection modules. Such multiple modules may be desired to keep the entire system running continuously. That is, each module can be cleaned, maintained, repaired by using one or more of the other modules, since cleaning involves mere backwashing of each module. If only one module is used, the other 2 modules are maintained in reserve for adding capacity and/or treatment of the waste stream and/or use when the currently used module needs cleaning, repairing, or maintenance. Of course, the use of 3 of each type of module is for illustration purposes only in that such number could be 1 or more. Moreover, the sequence of modules (anionic, cationic, anionic/cationic) could be altered and still be within the disclosure set forth herein.

As ionized waste stream 32 passes through anion collection module, 34, positive charged isotopes, such as nitrates, calcium, magnesium, and sodium, are attracted to and bond to the surface of the membrane material in anion collection module 34 until the electrical signal is removed and the membrane is placed in a backwash cycle to flush the dissociated isotopes. As shown in FIG. 1, two anion collection modules, 36 and 38, follow module 34, for the purposes described above. Of course, valving appears in each line for additional flow and treatment patterns. To that end, valves, 40, 42, 44, and 46, are shown in association with the anionic collection modules. Valves 42, 44, and 46 permit water to backwash anionic collection modules 34, 36, and 38, respectively. Finally, it should be noted that a power supply, 48, is used to supply the charge to the anionic collection modules.

Upon leaving anion collection module treatment operation, the waste stream then passes through a cation collection module assembly. Negative charged isotopes, such as, for example, ammonia, phosphate, chloride, and sulfate, are attracted to and bond to the surface of the membrane material in the cation ion membrane material until the electrical signal is removed and the membrane is placed in a backwash cycle. This all takes place within the system control firmware database network and is carried out by the system control program using an Allen Bradley 1768 CompactLogix Controller (Rockwell Automation, Milwaukee, Wis.) or equivalent program logic controller (PLC). As shown in FIG. 1, two cation collection modules, 52 and 54, follow cation module 50, for the purposes described above.

Of course, valving appears in each line for additional flow and treatment patterns. To that end, valves, 56, 58, 60, and 62, are shown in association with the cationic collection modules. Valves 58, 60, and 62 permit water to backwash anionic collection modules 50, 52, and 54, respectively. Finally, it should be noted that a power supply, 64, is used to supply the charge to the anionic collection modules.

The final module assembly is the anion/cation collection module assembly. This module works like the anion and cation module on any possible molecularly bonded isotopes, such as, for example, ammonium nitrate, sodium chloride, and potassium sulfate. This module type also serves as a second line of defense in collecting any isotope not previously collected in either the anion or cation collection modules. Two different sets of such anion/cation collection module assemblies are illustrated in FIG. 1. Of course, depending upon the waste stream being processed, there could be one, two, or more such module assemblies used.

As shown in FIG. 1 for the first such anion/cation module assembly, two anion/cation collection modules, 68 and 70, follow module 66, for the purposes described above. Of course, valving appears in each line for additional flow and treatment patterns. To that end for the first anion/cation module assembly, valves, 72, 74, 76, and 78, are shown in association with the anionic/cationic collection modules. Valves 74, 76, and 78 permit water to backwash anionic collection modules 34, 36, and 38, respectively. Finally, it should be noted that a power supply, 80, is used to supply the charge to the anionic collection modules.

As shown in FIG. 1 for the second such anion/cation module assembly, two anion/cation collection modules, 84 and 86, follow module 82, for the purposes described above. Of course, valving appears in each line for additional flow and treatment patterns. To that end for the first anion/cation module assembly, valves, 88, 90, 92, and 94, are shown in association with the anionic/cationic collection modules. Valves 90, 92, and 94 permit water to backwash anionic collection modules 82, 84, and 86, respectively. Finally, it should be noted that a power supply, 96, is used to supply the charge to the anionic collection modules.

When the waste stream has passed through the final anion/cation collection module the waste stream is free of the undesired isotopes. Depending on the end users discharge requirements, the water can be discharged, reused, or run through a de-ionizing process and final ultrafiltration process prior to discharge to the water-polishing portion of the system. FIG. 1 shows the Clean Water Output discharged from various of the modules in the disclosed system in a line, 98, along with a line, 100, for passing the module waste to a backwash discharge tank, 102, where solid waste can be discharged in a line, 104, along with a recycle stream, 106, for combining with inlet stream 10 to the system.

The amount of water polishing necessary for a given waste stream is determined by the level of contaminant removal, as specified by local, state, and federal EPA regulations, the client is required to meet. The polishing process is achieved by using accepted standards and practices for turbidity, pH, tannin, de-ionization, de-mineralization, de-chlorination, desalination, and others, based on applicable EPA regulations. These discharge levels are part of the system control firmware database and are continuously monitored by instrumentation devices designed to detect such levels. In the event any level is detected outside the prescribed parameters of operation, as outlined in the system control firmware database, the system will automatically be switched to a diagnostic mode which will determine where the parameter is out of operational specifications and takes the necessary steps to correct that specific operational parameter, again using the PLC referred to above. During this time of assessment and correction, any discharge water will be diverted back upstream where it will be reprocessed for proper discharge levels.

The disclosed system is modular in that the various pieces of equipment can be rearranged into a different sequence, each particular module can be repeated any number of times, different recycle patterns can be implemented, residence times within each module, and the like, and the system still provide for the efficacious treatment of waste streams of widely diverse compositions.

Now that the system components and overall schematic of the disclosed wastewater cleaning system have been described, the details of each of the system components will be described.

Bi-Polar/Bi-Directional Flow Through Ionic Module

The flow through ionic modules (FTIM) 12 or 14 may be used in 4 different configurations. The details of the flow through ionic module will refer to module 12 for illustration purposes. While FTIM module 12 is shown as circular in cross-section, other cross-sectional configurations may be used. The vortex option is identical in both the capacitive cell configuration and the tri-capacitive cell configuration, as illustrated in FIGS. 2-7. A diffuser plate, 108, is located immediately adjacent to and inside of an inlet flange, 110. Diffuser plate 108 forces the waste stream to be spread in a manner that causes complete coverage over the electrode plates for maximum coverage and ionization. There are diffuser plates mounted every 12 inches of the length of the device, such as, diffuser plates, 112 and 114. Each interior diffuser plate operates in similar fashion, as does diffuser plate 108 in spreading the waste stream over the entire cross-sectional area of module 12. Every other diffuser plate is connected to a power supply for generating an electrical charge, positive or negative. Diffuser plates 108 and 114 are such electrically energize diffuser plates. Between each electrically charged diffuser plate is an intermediate diffuser plate, such as non-charged diffuser plate 112.

It will be observed in FIG. 3 that every other interior plate extends the length of module 12 for their charging with the same charge as the electrically charged diffuser plates. A plate, 116, is illustrative of such a plate. Interspersed between each longitudinally extending plate is a longitudinally extending plate that is not connected to an external electrical charge. A plate, 118, is illustrative of such a non-charged plate. Again, the longitudinally extending plates are alternated between an outside electrically charged collection plate and a non-externally charged collection plate. It should be apparent that diffuser plates 108 and 114, and correspondingly collection plate 116, may be positively or negatively charged depending upon whether an anionic module, cationic module, or anionic/cationic module is desired for the system. In FIG. 4, longitudinally extending collection plates collection plate 114 and 118 are seen along with the other longitudinally extending plates, which will not be separately numbered so as to not overly confuse these figures.

There are directional deflectors mounted on each electrode plate surface, which facilitate a spinning or vortex action of waste stream as it passes through the FTIM. The design aspect of the directional deflectors is part of the present disclosure. Deflectors, 120, 122, and 124, have been labelled for illustrative purposes. This vortex action allows for longer exposure to the ionization process before the waste stream leaves the module. This increase in ionization better facilitates the dissociation process and cleaning of the given waste stream.

The difference between the capacitive and tri-capacitive cells is electrical in nature. In the capacitive cell there are two electrode plates or collector plates, known as the anode and cathode. These plates are connected to the pulse generator output. The cells are bi-polar, and each electrode plate can be connected to either a positive or negative potential from the pulse generator. The internal configuration of the cell allows flow to go in either direction; thus, making it bi-directional in flow direction.

The tri-capacitive cell has 2 conductive plates, connected to the output terminals from the pulse generator, (anode + and cathode −) and 1 set of capacitive plates that are inserted between each of the conductive plates; thus, creating a circuit that electrically looks like 3 capacitors connected in series. This cell effectively changes the polarity of the waste stream as it passes from the positive to negative or negative to positive plates. This change in polarity of the ionized molecule intensifies the amount of molecular excitation of the water molecule and, thus, generates a greater dissociation effect on the waste stream molecule due to a 180-degree shift in the electro magnetic field being induced on the water molecule. Of course, the longitudinally extending electrode collection plates become charged by the charged diffuser plates, diffuser plates 108 and 114 in the drawings.

The electrode plates and the capacitive (non-charged) plate are coated, for example, titanium plates. The coating on the titanium plate may be iridium oxide, ruthenium oxide, or a combination of various mixed metal oxides, best designed to treat a given waste stream and being electrically stable, resistant to abrasion and repeated electrically charging. The coating of the titanium prohibits the titanium from being deposited in the waste stream as part of the ionizing process, making them the most desirable non-sacrificial electrode. If a sacrificial anode or cathode is used in a process, before the waste stream can be discharged, the metal deposited from the sacrificial anode or cathode must be removed from the waste stream.

In addition, each electrode plate and capacitive plate are designed also to operate as a diffuser to facilitate maximum coverage and exposure of the waste stream to the electrode array.

Sub-Sonic Particle Separation Module

Figure 8:
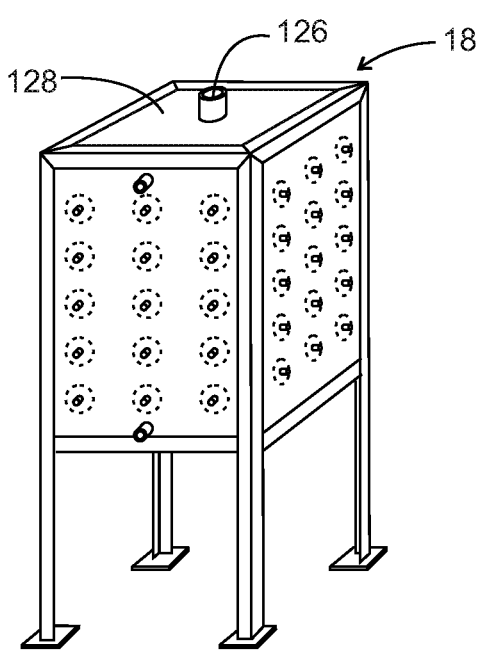
FIG. 8 is an isometric view of the subsonic particle separation module.
Figure 9:
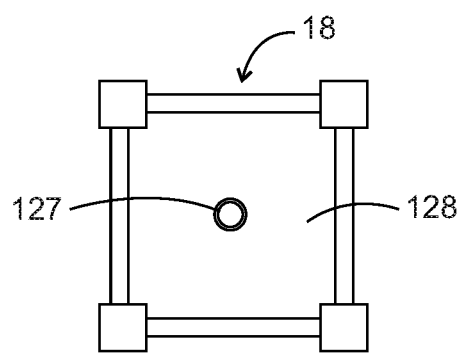
FIG. 9 is an end view of the subsonic particle separation module.

The next component in the system is the sub-sonic particle separation module identified as module 18 in FIG. 1. The purpose of this module is to induce a sub-harmonic frequency to the NMR resonant frequency of the identified isotopes within the waste stream. This sub-harmonic frequency is in the sub-sonic frequency range of 0-20 Hertz. This sub-sonic frequency can be a sine wave, square wave, or sawtooth waveform, depending on the intensity of the signal required to dissociate the heavy particles from the waste stream. Sub-sonic particle separation module 18 is mounted between 2 of the flow through ionizing modules. The energy of the sub-sonic frequency being induced into the waste stream is between about 25 watts and 10,000 watts per gallon, instantaneously. The minimum amount of energy required to impact the dissociation process of a molecule of water, whether electrical or acoustical, is 25 watts per gallon. The energy imposed on the water molecule creates friction, which creates a molecular excitation and better enhances the dissociation process of the isotope from the water molecule. While module 18 is shown in rectangular cross-section in FIGS. 8 and 9, circular, hexagonal, or any other geometrical cross-section may be used. The waste stream treated on module 18 is withdrawn through an outlet, 126, located in a top cover, 128. The inlet and bottom cover plate are not visible in the drawings.

Ultra-Sonic Particle Separation Module

Figure 11:
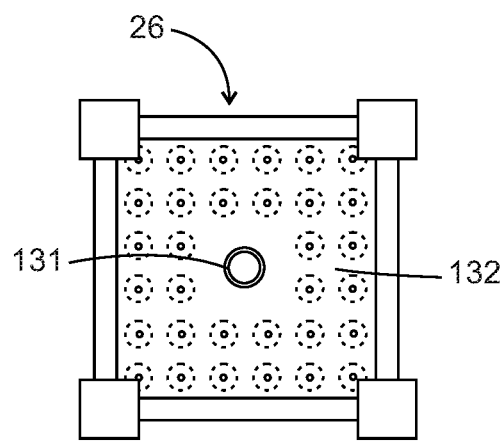
FIG. 11 is a bottom view of the ultrasonic particle separation module.
Figure 10:
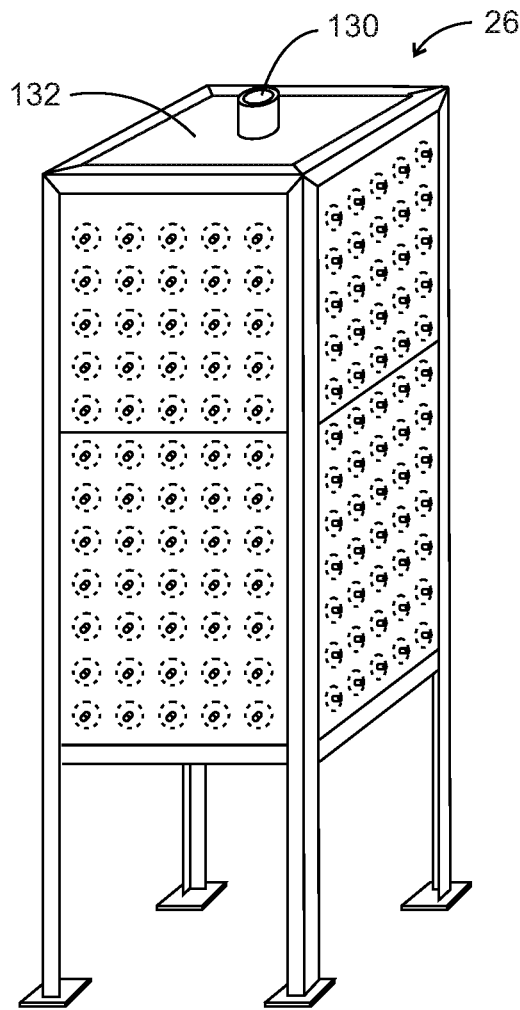
FIG. 10 is an isometric view of the ultrasonic particle separation module.
Figure 12:
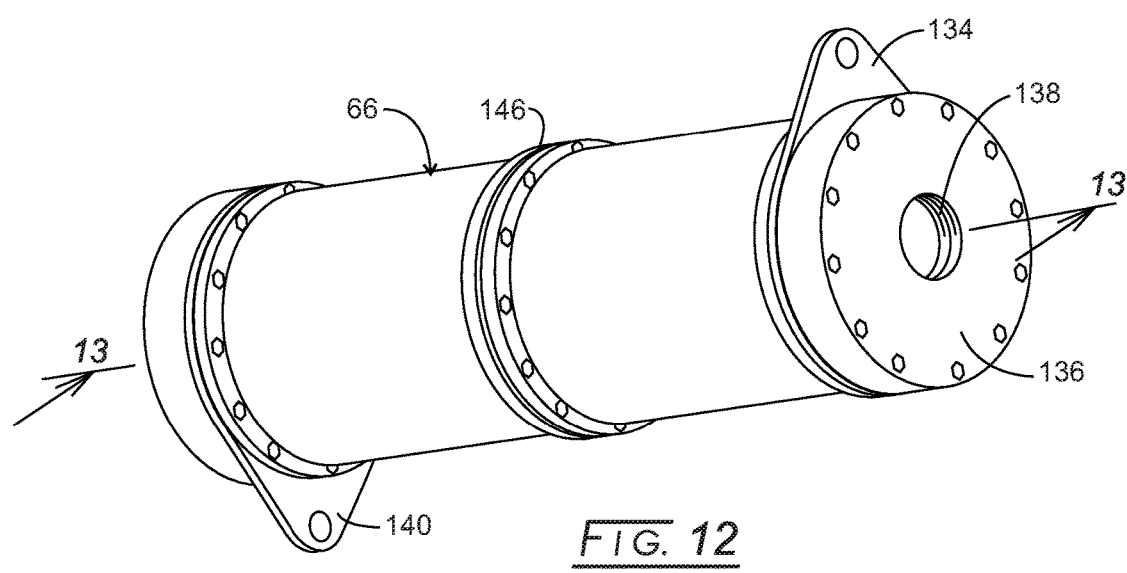
FIG. 12 is an isometric view of the pulsed ionic bi-polar/b-directional ionic membrane collection module.

Working in conjunction with the sub-sonic particle separation module is ultra-sonic particle separation module 26. This module also is placed between 2 of the flow through ionizing modules. Like sub-sonic module 18, the energy from the ultra-sonic frequency being introduced into the waste stream is between about 25 watts and 10,000 watts per gallon, instantaneously. The added effect the ultra-sonic energy, electrical pulse and the sub-sonic energy, impact on the water molecule, creating the dissociation process, which causes the dissolved solid isotope is released back to a semi-solid to solid state where it can be removed from the waste stream by the pulsed ionic bi-polar/bi-polar directional collection modules. The operational range of the ultra-sonic particle separation module is between 20,000 and 230,000 hertz. The final frequency is based upon the isotopic analysis of the given waste stream and the understanding of the resonant frequency of the various isotopes within the waste stream and is a sub-harmonic frequency of the NMR resonant frequency of a given Isotope. While module 126 is shown in rectangular cross-section in FIGS. 10 and 11, circular, hexagonal, or any other geometrical cross-section may be used. The waste stream treated on module 126 is withdrawn through an outlet, 130, located in a top cover, 132, which also is fitted with ultrasonic horns. The inlet and bottom cover plate are not visible in the drawings.

Pulsed Ionic Bi-Polar/Bi-Polar Directional Collection Module (Membrane)

The final component in the system is the pulsed ionic bi-polar and bi-directional collection modules or membrane identified as modules 66, 68, 70, 82, 84, and 86 in FIG. 1. These modules may be configured in one of three variations: the anion or negative, the cation or positive, and anion/cation or positive/negative. The membrane material used in manufacturing these devices is a woven matrix, ion exchange polymer, configured in either as a strong base or strong acid, such as AMI-7001 anion exchange membranes and CMI-7000 cation exchange membranes available from Astom Corporation (Tokyo, Japan). Of course, other commercially available similar charged membranes may be used.

The anion modules are designed with an encapsulating ion electrode array surrounding the anion membrane particle separation material. Because the anion membrane material is of a negative charge, the positive electrode is designed to be immediately adjacent to the membrane material in this module; thus, pushing the dissociated charged particle away from the electrode and toward the membrane material. The membrane material also is configured inside the electrode array whereby the axial positioning of the material is rotated 90 degrees every six inches of linear length. This creates a laminar flow within the module and contributes to consistent flow and pressure in the module. It also prohibits the membrane material from channeling and, thus, creates a maximum exposure of the waste stream to the membrane material. The purpose of the membrane material is to attract and capture the ionically charged anion isotopes dissociated from the waste stream.

Figure 13:
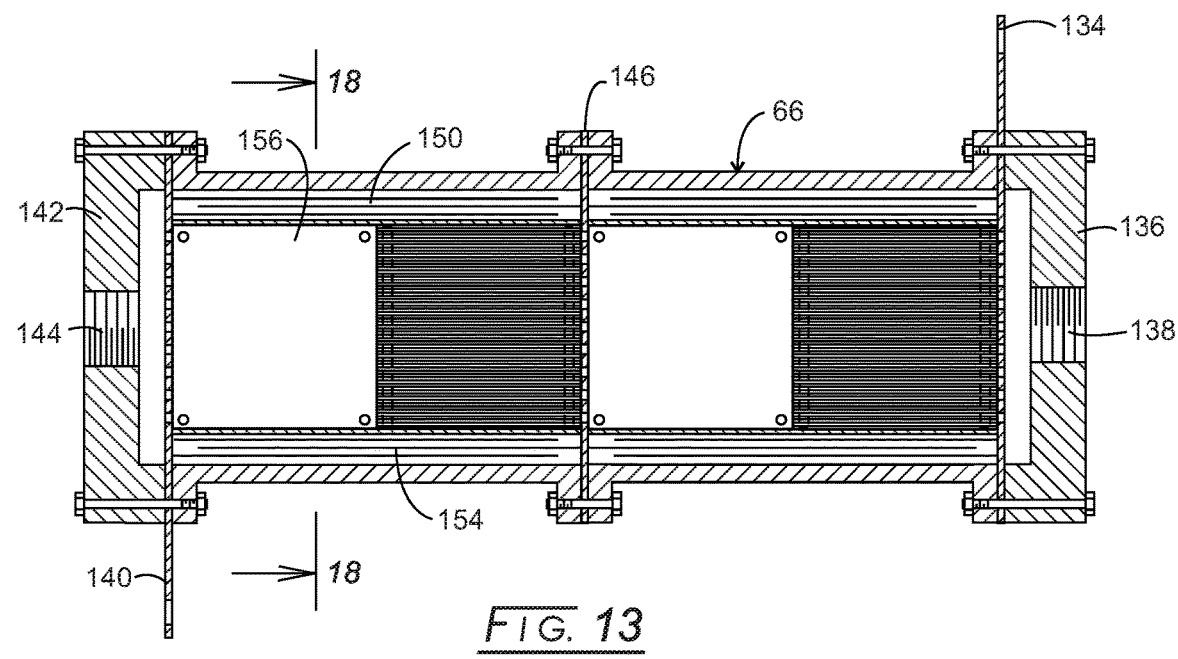
FIG. 13 is a sectional view taken along line 13-13 of FIG. 12.
Figure 14:
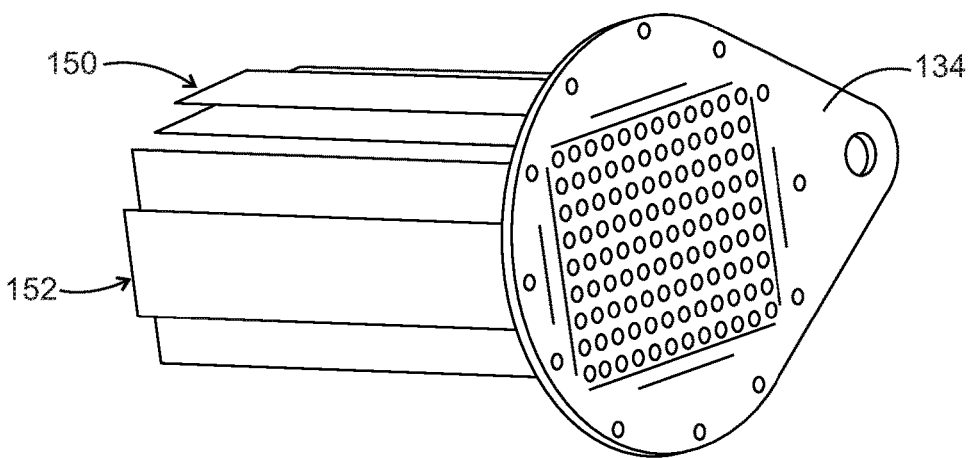
FIG. 14 is an isometric view of the pulsed ionic bi-polar/b-directional ionic membrane collection module with the outer shell removed.
Figure 15:
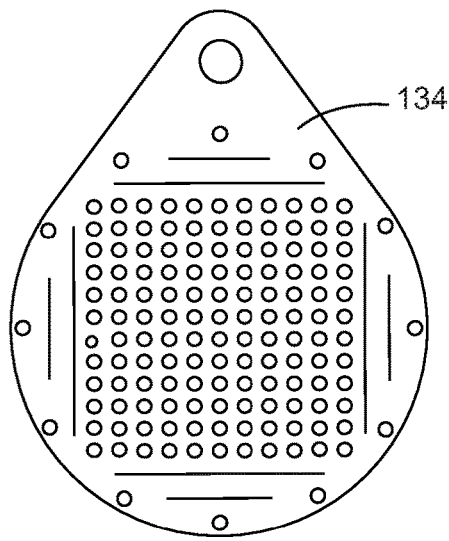
FIG. 15 is an end view of an anode diffuser ionic electrode plate of the pulsed ionic bi-polar/b-directional ionic membrane collection module.
Figure 16:
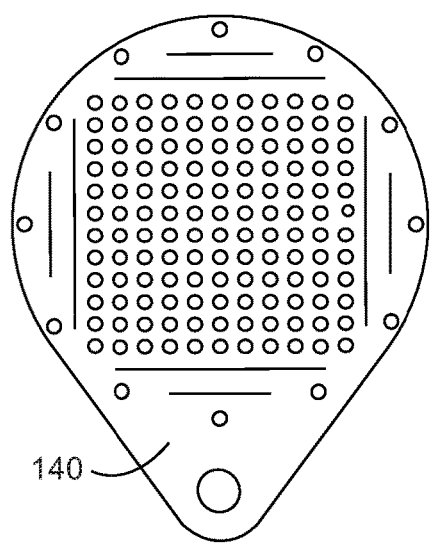
FIG. 16 is an end view of a cathode diffuser ionic electrode plate of the pulsed ionic bi-polar/b-directional ionic collection module.
Figure 17:
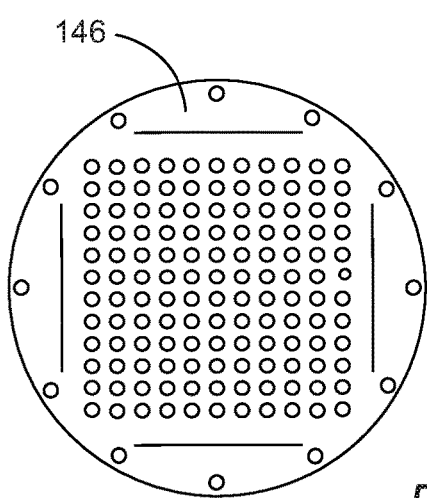
FIG. 17 is an end view of the tri-capacitive ionic diffuser plate of the pulsed ionic bi-polar/b-directional ionic collection module.
Figure 18:
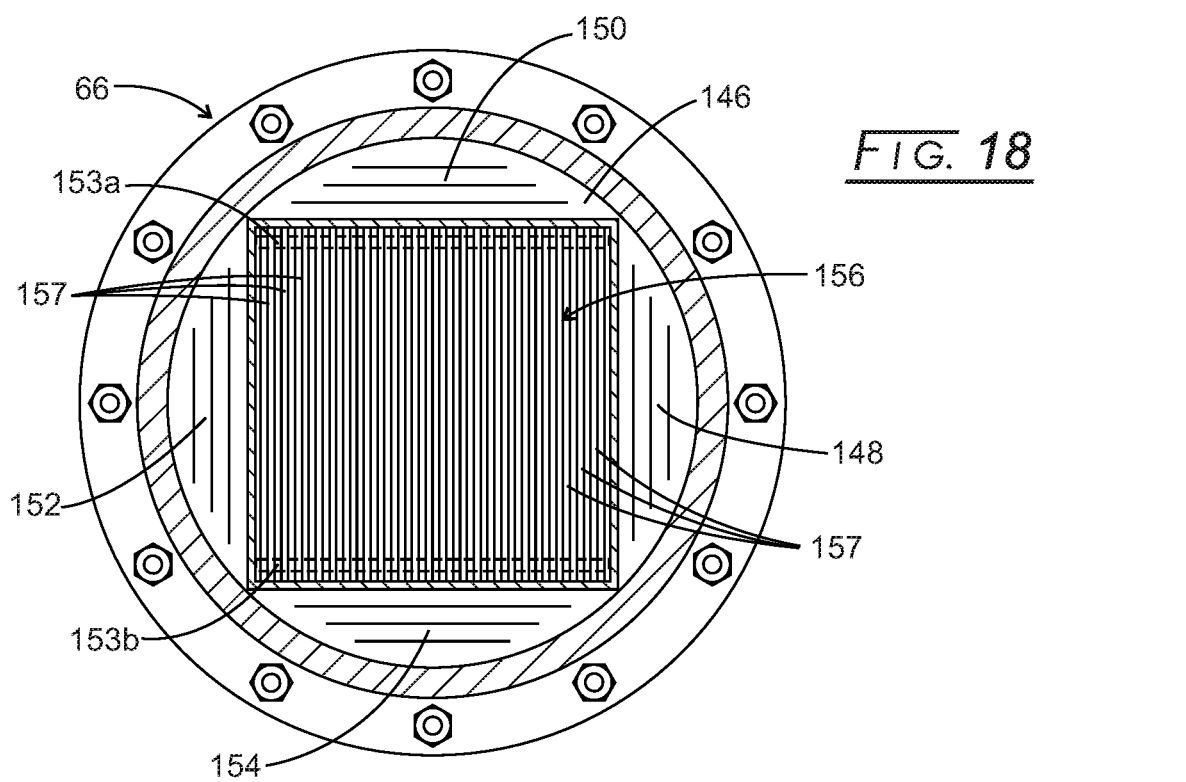
FIG. 18 is a sectional view taken along line 18-18 of FIG. 13.

In FIGS. 13 and 18, a positively charged plate, 134, is adjacent to an end plate, 136, having a waste stream inlet, 138, penetrating therethrough for inlet flow of the waste stream into module 66, which will used illustratively herein. On the outlet side, a positively charged plate, 140, is adjacent to an end plate, 142, having a waste stream outlet, 144, penetrating therethrough for outlet flow of the waste stream from module 66. Disposed intermediately is an intermediate flange, 146, which is not connected to an external electrical source. The design in the drawings calls for 12 inches distance between intermediate flange 146 and each end plate 134/140. The membrane stacks are rotated 90° every 6 inches along the lengthwise extent of module 66; thus, causing the flow to change directions for minimizing flow channeling. Each membrane stack is composed of 330 layers of charged membrane in the illustrated design. The design encourages the waste stream to flow in relatively thin film flow uniformly along the cross-section of module 66.

Figure 19:
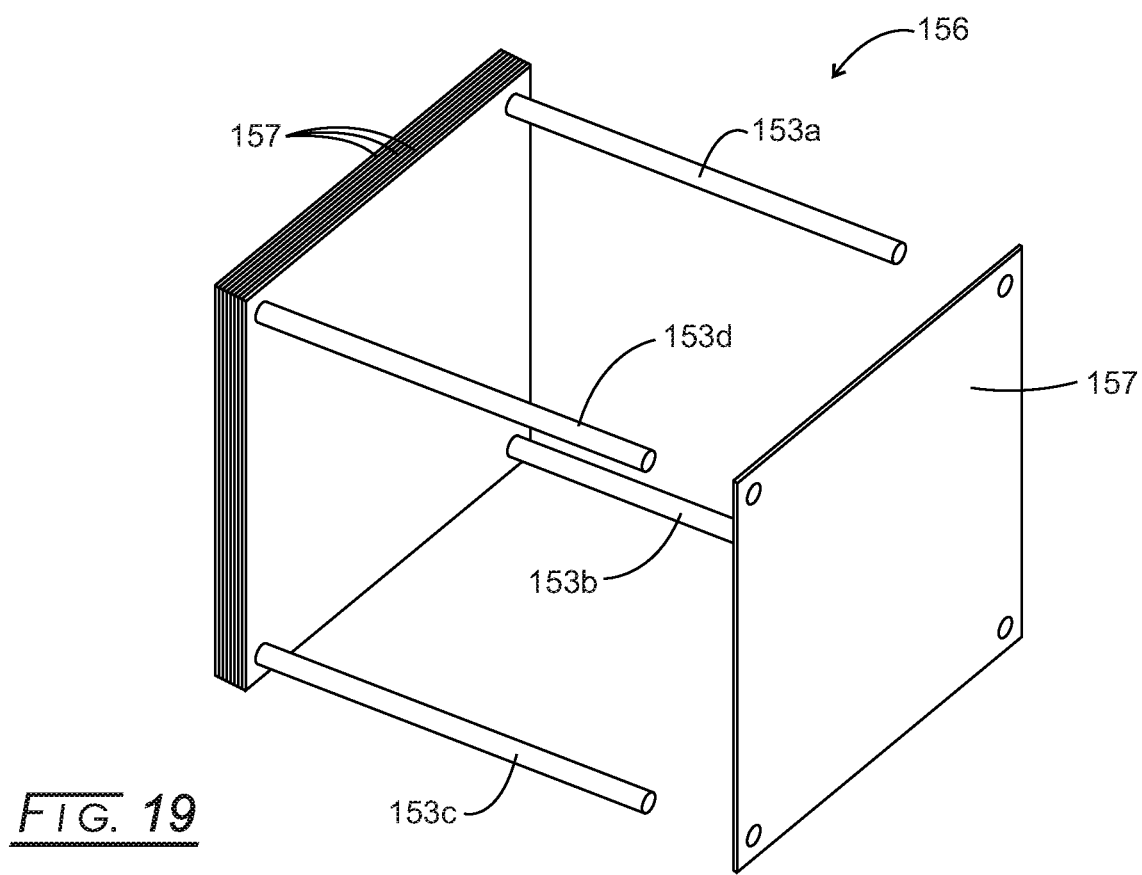
FIG. 19 is an isometric view of the membranes stacked on pins for the pulsed ionic bi-polar/b-directional ionic membrane collection module.

Disposed around the membrane stacks are longitudinally extending electrodes carrying either an anionic, cationic, or alternating anionic/cationic charge depending upon the charge impressed on the flange plates connected to the power supply for each module—power supply 80 for module 66 described herein. Such electrodes are charged the opposite of the membrane charge, as described above. In FIG. 18, electrode sets, 148, 150, 152, and 154, surround a membrane stack, 156. In FIG. 19, a membrane stack, 157, is carried by pins, 153a-153d.

The cation module is physically designed like the anion module with one exception. In the cation module, the negative electrode is designed to be immediately adjacent to the membrane material. The configuration of the membrane material is identical in all three configurations of this device. The other physical characteristics of the module are identical to the anion module. The purpose of the cation material is to capture the ionically charged cation isotopes dissociated from the waste stream.

The anion/cation module is just as the name describes. It is a combination of both materials configured in a layered fashion, alternating between negative and positive on each layer. As with the anion and cation modules, the corresponding electrode is located adjacent to a like polarity membrane material. In addition, this material is rotated axially 90 degrees, every 6 inches of linear distance. The purpose of the anion/cation module is to attract and capture those combined and/or remaining isotopes.

As with the flow through ionizing cell, each electrode plate also serves as a diffuser to facilitate maximum coverage and exposure of the waste stream to the membrane material.

Variable Pulse/Variable Frequency Ionic Generator (Power Supply)

Figure 20:
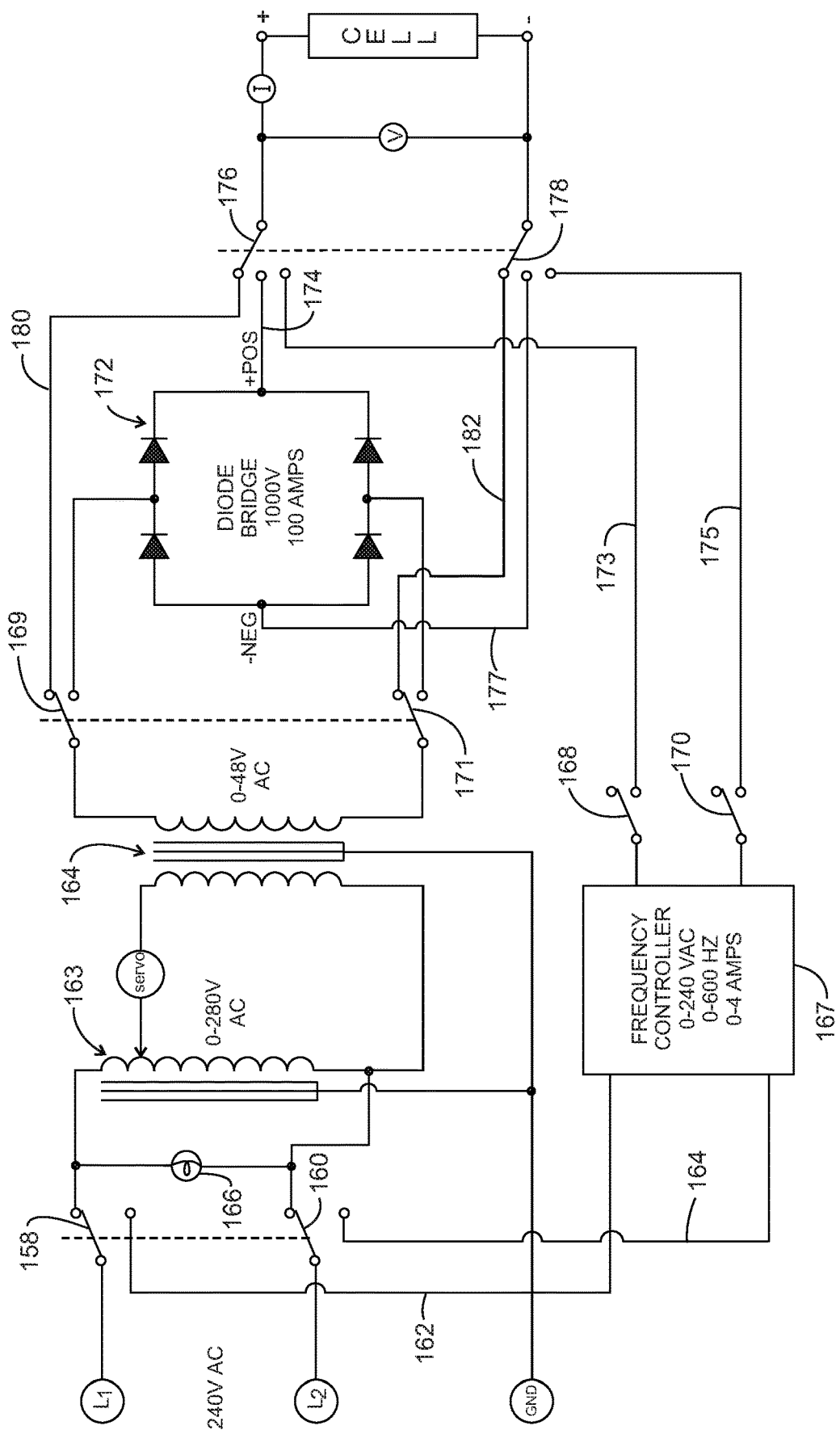
FIG. 20 is an electrical schematic of the variable pulse/variable frequency power supply.

The VPFIG illustrated in FIG. 20 has multiple functions within the overall operation of the system. It serves to provide the pulsed energy to two devices, the bi-polar/bi-directional flow through ionic module and the bi-polar/bi-directional pulsed ionic particle collection module. Outside of this application, this device can operate as a variable speed motor controller, an AC power supply with multiple waveform outputs, or a pulsed DC power supply. With the addition of filter capacitors across the output terminals, the DC supply would not be pulsed. In addition, with the addition of regulating diodes, the power supply could be described as a regulated power supply.

Research has shown a pure DC or AC voltage and current, alone, will not create the necessary molecular excitation required to cause a dissociation process to occur within the given waste stream, economically and efficiently. In this application other manufacturers operate at 12,000 watts per device. The disclosed system operates at 960 watts per device, which is 92% less than other manufacturers. The VPFIG is designed to provide a variable frequency, variable voltage, variable current, variable waveform, AC or DC voltage, and AC and DC voltage simultaneously, which generates a molecular excitation within the water molecule; thus, facilitating the dissociation process. For the waste stream we are using herein, the the VPFIG is designed to operate at 0-24 volts, 0-40 amps, pulsed at 120 Hz, as can be seen in FIG. 20.

In particular, 240 VAC is passed via lines L1 and L2 into the power supply through a pair of switches, 158 and 160, respectively. When these switches are in the down position, power is passed via lines, 162 and 164, into a frequency controller, 166. A pair of output switches, 168 and 170, in output lines, 173 and 175, pass power to a pair of 3-way switches, 176 and 178, respectively. These 3-way switches can be set to pass the frequency control signals to one of the cells described in connection with FIG. 1.

Figure 21:
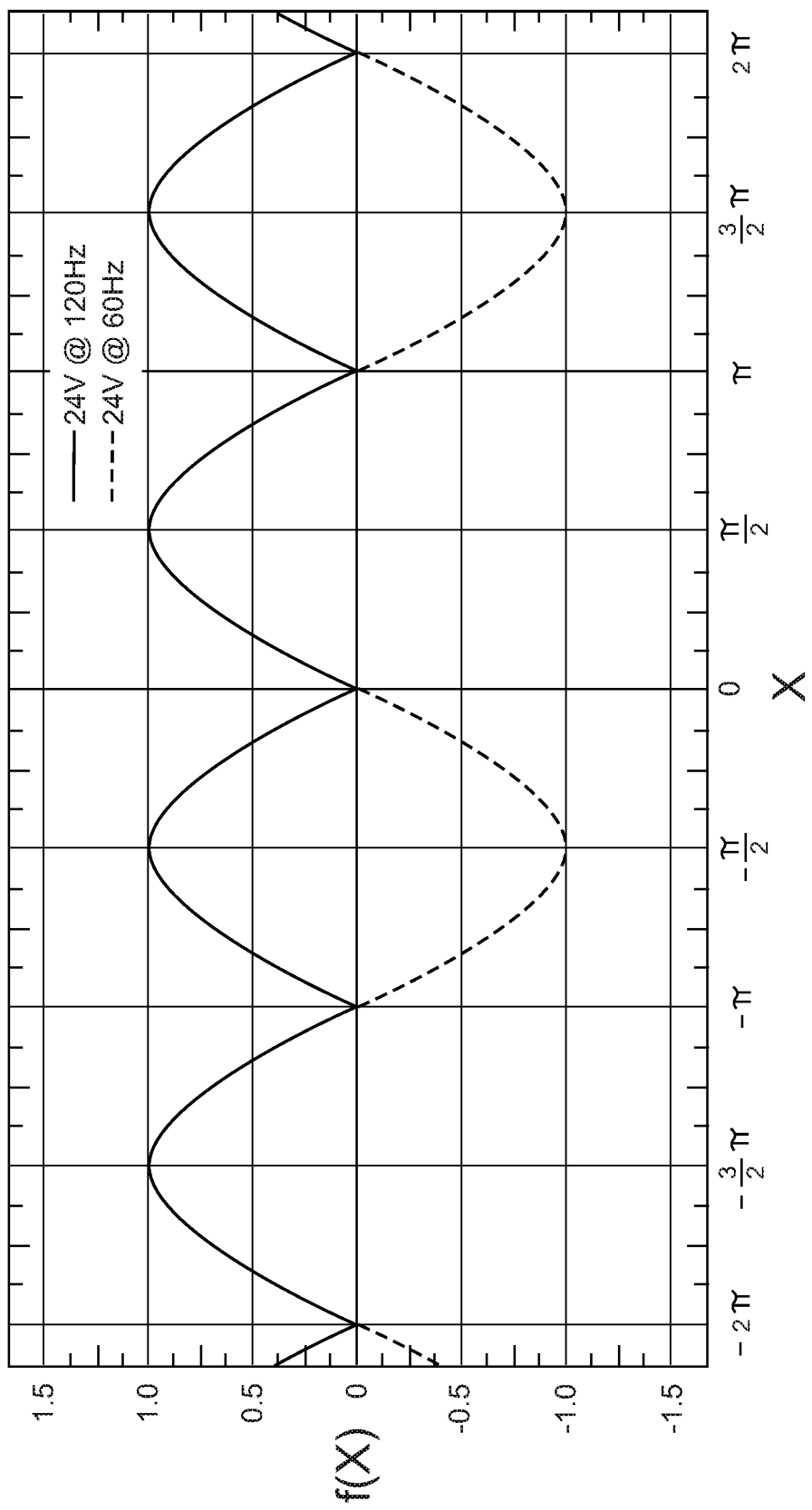
FIG. 21 is the power supply waveform generated by the variable pulse/variable frequency power supply.

Alternatively, switches 158 and 160 can pass the input line power pass an inductor, 163, connected in turn to a transformer, 164. Note that a light bulb, 166, runs between the two input lines for a visual cue that power is present in this circuit. Power from transformer 164 then passes through a pair of switches, 169 and 171, which can be positioned to pass the power into a diode bridge, 172, for generation of a pulsed signal. The positive and negative outputs from diode bridge 172 are connected via a pair of lines, 174 and 177, to 3-way switches 176 and 178. In the other position, switches 169 and 171 can per the power to be passed directly via lines, 180 and 182, respectively, to 3-way switches 176 and 178 bypassing diode bridge 172. Finally, FIG. 21 shows the waveforms generated by the disclosed power supply at 24 V at two different frequencies, as labeled thereon.

While the apparatus, system, and method have been described with reference to various embodiments, those skilled in the art will understand that various changes may be made, and equivalents may be substituted for elements thereof without departing from the scope and essence of the disclosure. In addition, many modifications may be made to adapt a situation or material in accordance with the teachings of the disclosure without departing from the essential scope thereof. Therefore, it is intended that the disclosure not be limited to the embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

The following example shows how the disclosed wastewater treatment system has been practiced. This example is given for illustration purposes and should not be interpreted as a limitation on the instant disclosure.

EXAMPLES

Example 1

Figure 22:
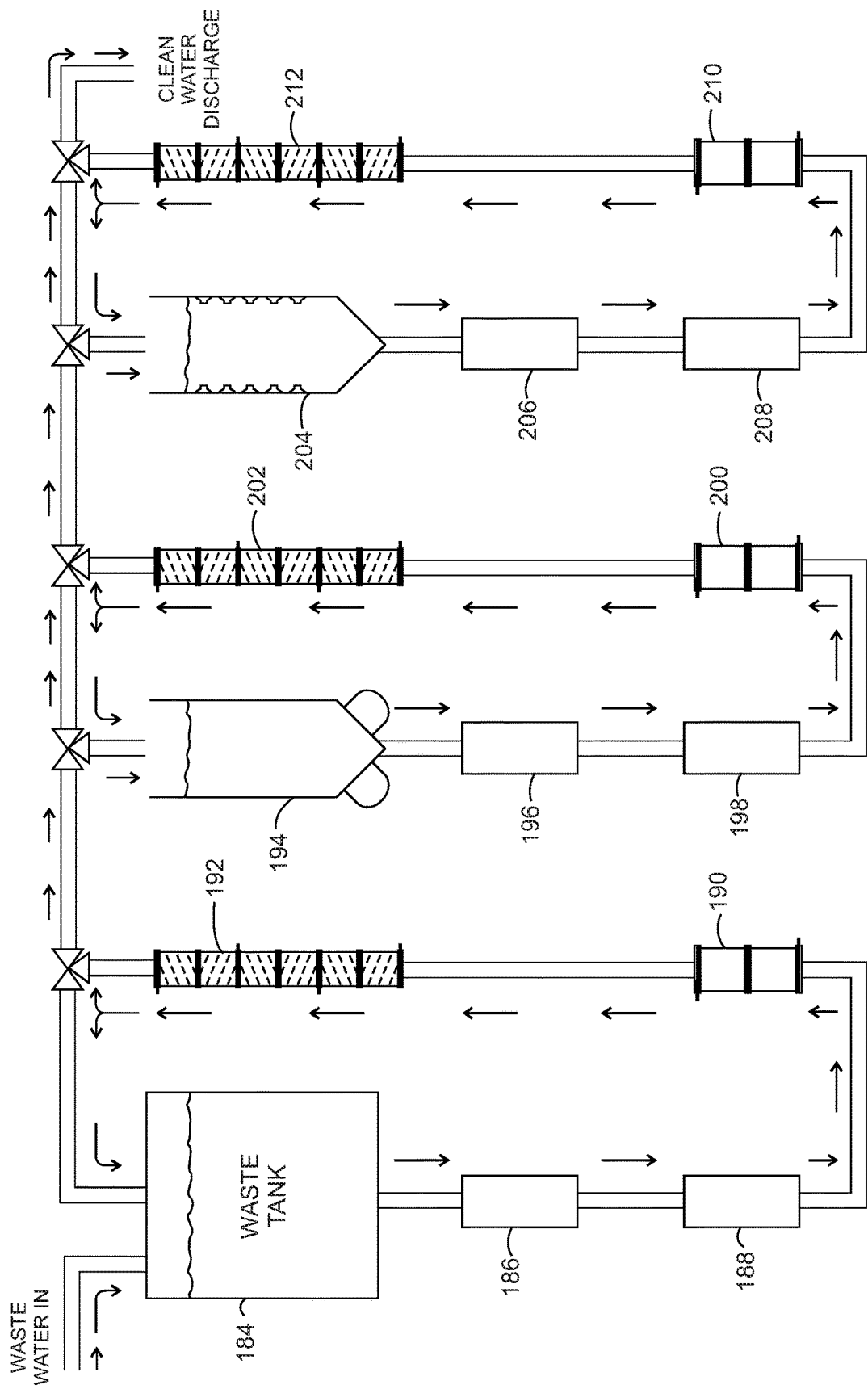
FIG. 22 is a system flow diagram used in the Examples. The drawings will be described in greater detail below.

The process equipment and configuration used in this example is set forth in FIG. 22. Basically, the wastewater flowed from a tank, 184, through a sediment filter, 186, a GAC filter, 188, anion filter, 190, and into a flow through ionic cell, 192. From FTIC 192, the wastewater could be recycled into tank 184 for additional treatment, or passed into a sub-sonic treatment tank, 194. Again, the wastewater from sub-sonic treatment tank 194, then was passed through a sediment filter, 196, a GAC filter, 198, cation filter, 200, and back into sub-sonic treatment tank 194. Again, this loop could be repeated. Alternatively, the wastewater was passed from sub-sonic treatment tank 194 into a super-sonic treatment tank, 204. From there, again the wastewater was passed through a sediment filter, 206, a GAC filter, 208, anion/cation filter, 210, and back into super-sonic treatment tank 204.

To a 70° lot of 100 gallons of municipal water with a projected total dissolved solids (TDS) of 60 parts per million (ppm) was added 60 pounds of calcium chloride and 20 pounds of sodium chloride. The actual TDS level as determined by an independent laboratory was 72,000 ppm. The objective of this test was to simulate removing dissolved solids from a waste stream typically found in a natural gas refinery. These dissolved solids are in the form of the added salts.

A one-inch diameter airline was placed in the waste tank of the salt solution and 100 psi of air pressure applied. This caused a vigorous mixing of the water and salts, facilitating the dissolving of the salts into solution. After a period of several hours of this mixing process, it was determined the salts to be fully dissolved into solution.

A sample of the water was collected and sealed according to laboratory standards and marked with date, time, and temperature, and then set aside for the independent laboratory to evaluate.

The initial step to remove the dissolved solids from the wastewater solution was the ionization and filtration process. The first step of this process is to recirculate this waste stream through flow through ionic cells, which were powered by a pulsed ionic generator. The setting for this pulsed ionic generator was 0-21.8 volts pulsed at 120 Hz, set to a current output of 0-40 amps. This ionization process is the beginning of the dissociation process to remove organic matter and dissolved solids from the water molecule. If this ionization process were to take place in a steady state tank, a green organic material would be seen coagulating in the body of water. Since we are recirculating the waste stream, the microscopic organic matter does not have time to coagulate or collect in a manner that is visible.

As the waste stream goes through a pulsed ionization process, it also is filtered before re-entering the storage tank. There are multiple filters configured to facilitate the removal of the organic matter and the various dissolved solids that have been dissociated from the water molecule. The first filter was an inline 1-micron sediment filter. This filter can be as small as 0.01-microns on down to the ultrafiltration range. For the purposes of this test, a 1-micron filter was selected. After the 1-micron sediment filter, the waste stream was passed through a granulated activated charcoal or GAC filter. During the ionization process, the salts begin to dissociate from the water molecule in their basic elemental form. For this waste stream, the basic elements are calcium, sodium, and chloride ions.

The pulsed ionization process induces a pulsed electrical current into the water molecule. This pulsed electrical current causes the water molecule to lose the covalent bond it has on the dissolved ions. The process of breaking this covalent bond is called dissociation. Research has shown that by removing the organic matter first, the basic elements, which have been dissolved into solution can be more readily dissociated.

As the pulsed ionization process induces the pulsed electrical current into the water molecule the dissociation process begins to take place. As the chloride is dissociated from the water molecule it is converted from a chloride ion to chlorine. The chlorine is a negatively charged particle. The GAC filter is designed to attract the chlorine molecule as it is passed through the GAC filter media because it is charged to a positive potential, which causes the attraction of the chlorine molecule. This attraction process removes the chlorine from the water molecule.

This completes the first step of the cleaning process. With the organic matter out of the way for the chlorides, calcium, and sodium out of the way, we transfer the waste stream to a second process tank. In this process tank we repeat the pulsed ionization process and introduce another for of energy. This form of energy is sub-sonic sound waves or acoustical energy. The frequency introduced is derived from information obtained from a Nuclear Magnetic Resonance Periodic Table, (NMR). The information from the NMR gives us the specific resonant frequency of a given Isotope, such as chloride, calcium, and sodium. The sub-sonic frequency we select is in a range of 0-20 Hertz and is below the range of human hearing. The selected frequency is a sub-harmonic frequency of the resonant frequency information obtained from the NMR. The selection of the 120 hertz pulsed electrical energy is also a sub-harmonic frequency of the resonant frequency. These two types of energy are additive when imposed simultaneously upon the water molecule.

Because not all the chlorides, calcium, and sodium were removed in the initial pulsed ionization process, it is necessary to repeat the process in introduce this second form of energy. The long wavelength of the sub-sonic frequency and the pulsed ionic electrical current together, cause the larger particles to dissociate from the water molecule, where they are filtered out using the same filtration process in the previous steps.

As the sub-sonic with pulsed ionization steps and filtration is completed, the waste stream is transferred to the next tank. During this step we are concentrating on the smallest particles still bonded to the water molecule. During this step we continue the pulsed ionization process and introduce a third form of energy. This form of energy is ultra-sonic energy. This too is another form of acoustical energy above the range of human hearing. The range of the frequencies used in this process was from 20,000 hertz to 230,000 hertz. The wavelength of these frequencies is extremely short and designed to attack the smallest of microscopic particles, which have maintained their covalent bond to the water molecule. The selected in the ultra-sonic range is also a sub-harmonic frequency obtained from the information on the NMR, regarding the associated Isotopes of the waste stream.

During the third stage of the process, the pulsed ionic current and the ultra-sonic sound waved are imposed on the water molecule simultaneously. The magnitude of energy now being imposed on the water molecule causes a break in the remaining covalent bond maintained between the water molecule and any remaining chloride, calcium, and sodium ions. As this covalent bond is broken the electrical charge taken on by the given ion facilitate removal from the waste stream in the final filtration process.

The final filtration process consists of three filters. The first filter is a 0.01-micron ultra-filter, which is designed to remove the smallest particles dissociated from the water molecule. The second filter is GAC. This is designed to facilitate the removal of any additionally dissociated chlorine or chloride molecules. The third stage of filtration is now a mixed bed filter of both anion and cation media. The anion media will attract any of the remaining calcium and sodium. The cation media will attract any of the remaining chloride or chlorine, not removed in the GAC filter.

Because the system configuration used for this test was not designed to facilitate a backwash process for the various filters, each filter was removed allowed to open air dry. The collected material in each filter was reflective of the design specifications of each filtration process. The sediment filter contained a green organic matter, resembling green algae. The GAC filter had crystalline structures resembling the appearance and smell of chlorine crystals. The anion and mixed filter media had crystalline structures resembling and smelling like calcium and sodium. To prove the collection of sodium, small portions of the dry powder were collected and subjected to destruction testing with a hammer on a hard surface. The dry powder reacted much like pure dry sodium would react and gave a sound like a child's toy cap gun.

After the waste stream was passed through the final stage of filtration, a second sample was taken, and measurement logged. The initial results were a pH of 7.8, TDS level of 23, and temperature of 78° F. The independent laboratory findings are contained in the report dated Dec. 20, 2016. The lab report results indicated the starting TDS level was 72,000 PPM and the ending TDS level was 20 PPM.

Example 2

This test was an actual test of the waste stream from a plant located in Wyoming. For this test, 50 gallons of the actual waste stream from the Wyoming LTG refinery was used. Prior to testing a sample was collected and labeled for processing by an independent laboratory.

The processing was the same as reported in Example 1 using the process configuration described in connection with FIG. 22. This waste stream had a pH of 12, TDS of 59,000, and temperature of 78° F.

The findings of the independent laboratory were as follows: initial TDS 55,700 mg/L (dry) and pH 12.2. Post processing, the TDS was 17.0. For this test pH was not reported by the lab.

Example 3

275 gallons from an anaerobic digester waste from a commercial plant located in Wisconsin with total suspended solids of 57,000 ppm was subjected to the same process configuration as described above in connection with FIG. 22 and as used in the prior examples.

Due to the viscous nature of the anaerobic digester waste stream, a complete network of pre-process filtration was required to remove the large volume of total suspended solids from the waste stream. The first stage of this filtration process was accomplished using steel mesh screens. This was done manually by pouring the waste stream through the mesh screens, removing the largest clumps of waste material. This process was repeated until there were no longer any visible clumps of material.

Upon completion of the rough filtration, the waste stream was filtered again through a cloth filter, which would pass particles larger than 150 microns. When this was completed, the waste stream could then be pumped through incrementally smaller micron filters until we had process the waste stream down to 1 micron.

After reducing the particle size to 1 micron, the waste stream then was passed through an ultra-filter, reducing the particle size down to 0.01 microns. At this point the waste stream became an amber or gold color, much like gasoline.

Observations were notated as to color, smell, pH, and TDS. The liquid was now clear, but still a golden color. The pH had been reduced to 7.5 while the TDS and TSS were reduced to less than 1,000 PPM. The smell was no longer a strong ammonia smell, but a milder ammonia odor which revealed the stronger sulfur and animal waste smell.

The operational sequence of our laboratory system had not been changed since the previous tests were completed. The purpose for this non-change was to prove that the disclosed process could treat a totally unknown waste stream to satisfactory EPA standards for discharge. This non-change also demonstrated a non-chemical treatment to the waste stream as part of the cleaning process. This was done for demonstration purposes, as this waste stream contained live bacteria cultures and it is desired that a commercial system be able to recover these bacteria for reuse in the anaerobic digester process.

It must be stated at this point that had the independent laboratory analysis been available, the system would have been configured slightly differently for this test. Nevertheless, the ability and flexibility of the basic process is demonstrated in this example.

When the initial filtration process was completed, the anaerobic digester waste stream was pumped through the flow through ionic cell where it is introduced to the pulsed ionic current induced through the ionic cells from the pulsed ionic generator. As the material is pumped through the ionic cell, there are several things that take place during this part of the cleaning process. The first thing that happens is the ionization of the water molecule begins to occur. This ionization is a result of the pulsed ionic current being applied to the flow through cell electrode plates from the pulsed ionic generator, charging the water molecule. In addition, this electrical charge causes molecular excitation within the water molecule and the ionic dissociation process begins to take place. This dissociation process is where the dissolved solids within the water molecule are released from their covalent bond with the water molecule and dissociated from the water molecule.

As the isotope is dissociated from the water molecule, an electrical charge is induced into the isotope. There is one other thing that begins to take place in this waste stream that must be notated here. This waste stream contains several isotopes that lend themselves to a molecular bond with each other. They are ammonia, nitrates, phosphorus, and sulfate.

As each of these isotopes begins to take on an electrical charge, and due to the amount of electrical current being pulsed through the waste stream, an oxidation process begins to occur within the various isotopes. An example of this is ammonia begins to change to an ammonium ion. As it changes states, it becomes able to create a molecular bonding with the other isotopes; thus, creating, for example, ammonium nitrate, ammonium phosphate, ammonium sulfate. These components are recoverable for use in other applications.

After processing the waste stream through the flow through ionizing cell, the waste stream was pumped through the first stage of filtration, Zeolite. The function of Zeolite is to remove any ionized ammonia molecules from the waste stream.

The waste stream then was processed through another stage of the flow through ionic cell. This additional ionic charge facilitated the removal of the other dissociated isotopes in the flow through ionic membranes. After process through the flow through cell, the waste stream was passed through 3 stages of pulsed ionic membrane material. At this point the color of the waste stream had changed even more. It must be notated the TDS level of the waste stream had been reduced from 57,000 PPM down to 146.4 PPM.

The next part of the process was to treat the color of the waste stream for turbidity or color. The waste stream was passed through a turbidity filter. After passing through a turbidity filter, the waste stream was passed through granulated activated charcoal and a final filtration for pH balance. This final stage of pH balance introduced some calcium and magnesium minerals back into the waste stream, raising the final TDS readings to 364 PPM.

In summary, as stated earlier herein, the laboratory system configuration was non-changed for the processing of this waste stream. Also, previously stated was the fact the ammonia was removed from the waste stream immediately after the first stage of pulsed ionization. In a commercial unit, the ionization process would be conducted for a much longer period, allowing for a covalent or molecular bonding to take place between the various isotopes within the waste stream, as described earlier herein. In addition, there was no chemical treatment added to this test. In a commercial unit, due to the high level of bacteria culture present, a chlorine chemical treatment would be added prior to the ionization process. This chloride treatment would kill any remaining bacteria in the waste stream and facilitate the system's ability to process the waste stream to clean drinking water standards, thus demonstrating the full capability of the system.

The independent laboratory findings for the initial waste stream and the final cleaned waste stream are set forth below.

| Measurement | Initial | Final |
|---|---|---|
| TDS | 5,700 mg/L | 364 mg/L |
| Ammonia | 2,657 mg/L | 2.5 mg/L |
| Calcium | 2,060 mg/L | 20 mg/L |
| BOD | 30,355 mg/L | 15 mg/L |
| Nitrogen | <2 mg/L | <0.10 mg/L |
| Phosphorus | 1,017 mg/L | 1.1 mg/L |
| Sodium | 1,245 mg/L | 7.0 mg/L |
| Sulfate | 104 mg/L | 1.2 mg/L |
| Turbidity | 43,333 NTU | 6.8 NTU |
| Conductivity | 26,900 um/cm | 392 um/cm |
| Iron | 1,853 | 0.05 mg/L |

I claim:

1. A method for treating wastewater having one or more of suspended solids, dissolved solids, biological oxygen demand, which comprises the steps of:
   (a) determining the total suspended solids (TSS), total dissolved solids (TDS), biological oxygen demand (BOD), pH, conductivity, and various isotopes or elements in the wastewater to be treated;
   (b) subjecting the wastewater to filtration to affect substantial removal of suspended solids greater than about 0.01p particle size;
   (c) passing the filtered wastewater through a bi-polar/bi-directional flow through ionic module fitted with anionically charged plates for removing at least some of the cations present in the wastewater;
   (d) passing the resulting wastewater stream from step (c) through a sub-sonic resonance module for removing at least some of the isotopes in the wastewater responsive to subsonic resonance frequency;
   (d) passing the resulting wastewater from step (d) through a first bi-polar/bi-directional flow through ionic module fitted with cationically charged plates for removing at least some of the anions present in the wastewater;
   (e) passing the resulting wastewater stream from step (d) through a ultra-sonic resonance module for removing at least some of the isotopes in the wastewater responsive to ultrasonic resonance frequency;
   (f) passing the resulting wastewater from step (e) through a second bi-polar/bi-directional flow through ionic module fitted with both anionically charged plates and cationically charged plates for additional removal of anions and cations in the wastewater;
   (g) passing the resulting wastewater from step (f) through one or more anion collection membrane modules for removal of cations in the wastewater stream by their collection on the charged membranes therein;
   (h) passing the resulting wastewater from step (g) through one or more cation collection membrane modules for removal of anions in the wastewater stream by their collection by the charged membranes therein;
   wherein, recycle is provided in each step, wherein each step may be repeated, and wherein one or more of the steps can be bypassed.

2. The method of claim 1, wherein each of the first and second bi-polar/bi-directional flow through ionic modules are fitted with vortex plates for effecting rotation of the wastewater flowing therethrough.

3. The method of claim 1, wherein the one or more a nion collection membrane modules and the one or more cation collection membrane modules contain a plurality of membranes oriented with the wastewater flow, wherein the plurality of membranes are periodically rotated 90°.

4. The method of claim 1, wherein any one of the first or second bi-polar/bi-directional flow through ionic modules are replaced by one or more tri-capacitive cells having 2 conductive plates connected to output terminals of a power supply, either anode or cathode, and 1 set of capacitive plates that are inserted between each of the conductive plates to create a circuit that electrically looks like 3 capacitors connected in series.

5. The method of claim 4, wherein the one or more tri-capacitive cells alternate between a nionically charged conductive plates and cationically charged conductive plates.

* * * * *